United States Patent [19]

Gardner et al.

[11] Patent Number: 5,761,665
[45] Date of Patent: Jun. 2, 1998

[54] METHOD OF AUTOMATIC DATABASE FIELD IDENTIFICATION FOR POSTAL CODING

[75] Inventors: David P. Gardner, New Milford; Steven M. Kaye, Westport; Jeffery D. Pierce, Norwalk, all of Conn.

[73] Assignee: Pitney Bowes Inc., Stamford, Conn.

[21] Appl. No.: 551,257

[22] Filed: Oct. 31, 1995

[51] Int. Cl.$^6$ .................................................. G06F 17/30
[52] U.S. Cl. .......................... 707/100; 707/101; 707/2; 707/7; 707/5
[58] Field of Search ...................... 395/600; 380/51; 707/2, 7, 5, 100, 101

[56] References Cited

U.S. PATENT DOCUMENTS

| | | | |
|---|---|---|---|
| 5,326,181 | 7/1994 | Eisner | 400/104 |
| 5,384,703 | 1/1995 | Withgott et al. | 364/419.19 |
| 5,448,641 | 9/1995 | Pintsov et al. | 380/51 |
| 5,515,534 | 5/1996 | Chuah et al. | 395/600 |

OTHER PUBLICATIONS

Jenq-Neng Hwang et al., "Gibbs Sampling via Neural Network Probability Estimation", IEEE, pp. 441-445, Jan. 1992.

M. Kantardzic et al.; "Graphical Knowledge Based Electronic Mail System (GKBEMS)", IEEE, pp. 1165-1168, Jan. 1991.

Amotz Bar-Noy et al., "Multiple Message Broadcasting in the Postal Model", IEEE, pp. 463-470, Jan. 1993.

*Primary Examiner*—Thomas G. Black
*Assistant Examiner*—Cheryl R. Lewis
*Attorney, Agent, or Firm*—Robert H. Whisker; Melvin J. Scolnick

[57] ABSTRACT

The invention is a method of determining the contents of a selected data field. The steps begin by attaching, from an application program, a database to be mapped. Once the database is attached, a field identification module (FIM), will scan the contents of the database to determine a data field identifier for each of the data fields to be worked upon. The FIM will then compare each of the data field identifiers with a list of known identifiers stored in a repository and assess a first score in respect of the comparison wherein the score is representative of a probability that the comparison is an accurate comparison. When a first probability score has been determined, the FIM will sample the data field according to a pre-selected list of requirements and make a second comparison with the data field. The FIM will then assess a second score. After sampling and scoring the data field, the FIM will construct a test case wherein the data field is used in the postal coding or host application and a third comparison is made in respect of the test case. The FIM will then assess a third score. The FIM will choose a field type based on the weighted average result of the three scores, and then request that the system operator confirm the selected field type. Once confirmed, the data field identifier and the data field represented thereby are added to the repository as one of the known identifiers.

16 Claims, 5 Drawing Sheets

METHOD OF AUTOMATIC DATABASE FIELD IDENTIFICATION FOR POSTAL CODING

BACKGROUND OF THE INVENTION

This invention relates to the field of database management and field identification. More particularly, it relates to the identification of database fields being introduced to a postal coding application where that application is looking for data to be assigned a postal code or zip code.

The Post Office currently utilizes automated mail sorters which sort envelopes on the basis of a zip code encoded as an imprinted machine readable bar code. To be acceptable for use, the encoded bar code must meet strict specifications as to size, spacing of parallel bars, and placement upon the envelope. Accordingly, there is a need for accurate, but relatively inexpensive addressing or postal coding systems that will reduce the human intervention required for the host application to match a database offered to it with the application that is going to read that database for the purpose of extracting relevant data. Relevant data might include such data as salutation; first name, last name, street address, and zip+4, to name a few.

As the United States Postal Service, together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the United States, Postal Service regulations provide for a "Postnet" bar code which represents the five or nine digit zip code of the destination address in a machine readable form.

Systems have been used or proposed to meet the need to produce mail pieces imprinted with the Postnet bar code, and to enable mailers to obtain the benefit of the discounts offered for such mail. One such system is described in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. But, bar coding and address printing by smart printers is only as good as the data offered to the system. Thus, database management has grown in importance.

Systems have been used or proposed to meet the need of more effective database management by offering ways to access databases more quickly, provide summaries or field identifiers of the database contents where such summaries could be read to provide a quick check of the relevance of a particular data field to a host application. One such system is described in U.S. Pat. No. 5,384,703 for a METHOD AND APPARATUS FOR SUMMARIZING DOCUMENTS ACCORDING TO THEME; issued to Withgott et al. (Withgott), on Jan. 24, 1995. Withgott correctly points out that while document summaries assist in the review and/or translation of documents because entire documents need not be read; however, even the method of Withgott falls short if the data being summarized is data that a host application does not understand. Therefore, a method is required that will identify the relevance of the contents of a database field.

The present invention overcomes the limitation of the prior art by providing a method of determining the relevance of the contents of a data field and thus fostering effective time utilization and improved accuracy in determining what data may be accessed for use with a host application generally, or for use with a postal coding engine specifically. Effective time utilization and improved accuracy are accomplished through consistent application of the decision making model.

SUMMARY OF THE INVENTION

According to the invention, the object is achieved and the disadvantages of the prior art are overcome by a method, comprising several steps, of determining the contents of a selected data field. The combined steps are referred to as a mapping cycle.

The steps begin by attaching, from an application program (such as a postal coding program) in a data processing system, a database to be mapped. Once the database is attached, a field identification module (FIM) either resident within the application program or acting as a standalone module not resident within the activation program, will scan the contents of the database to determine a data field identifier for each of the data fields to be worked upon. The FIM will then compare each of the data field identifiers with a list of previously identified identifiers stored in a repository and assess a first score in respect of the comparison wherein the score is representative of a probability that the comparison is an accurate comparison. The comparison is made by looking up the database field name in the repository. If the database field name and the repository field name are the same, then there is a match; a match is assessed a score of 1.0, while a non-match is given a 0.0 score. This process is typically repeated for each field in the database. The repository contains a list of previously identified data field identifiers and their corresponding data field names. The repository may be co-located with the database or may located independently of the database.

When a first probability score has been determined, the FIM will then sample the data field according to a preselected list of requirements and make a second comparison wherein the data field is compared with the preselected list of requirements. Each of the requirements of the preselected list are equal to one part, each part of equal weight (though the weight can be shifted depending upon experience or need), and each combined totaling no more than 0.7. The FIM will then assess a second score in respect of the sampling wherein the second score is representative of a probability that the second comparison is an accurate comparison. In the preferred embodiment of the present invention, the score will not exceed 0.7, though this threshold could be shifted for alternative embodiments according to the requirements of the embodiment. Again, this process is typically repeated for each field in the database.

After sampling and scoring the data field, the FIM will construct a test case wherein the data field is used in the postal coding or host application and a third comparison between an actual result and an expected result is made in respect of the test case. The FIM then will then assess a third score in respect of the test case wherein the third score is representative of a probability that the third comparison is an accurate comparison. As before, this process is typically repeated for each field in the database. In the preferred embodiment of the present invention, the score will not exceed 0.7, though this threshold could be shifted for alternative embodiments according to the requirements of the embodiment.

After assessing the three scores, the FIM will choose a field type based on the weighted average result of the first score, the second score, and the third score. The first score, the second score, and the third score are weighted by pre-selected weight according to relative value as they are individually assessed; they are then factored to produce a score.

The FIM will then signal the system to request that the system operator confirm the selected field types. Once confirmed, the data field identifier and the data field represented thereby are added to the repository as one of the known identifiers.

DETAILED DESCRIPTION OF THE PREFERRED EMBODIMENTS

Figure 1:
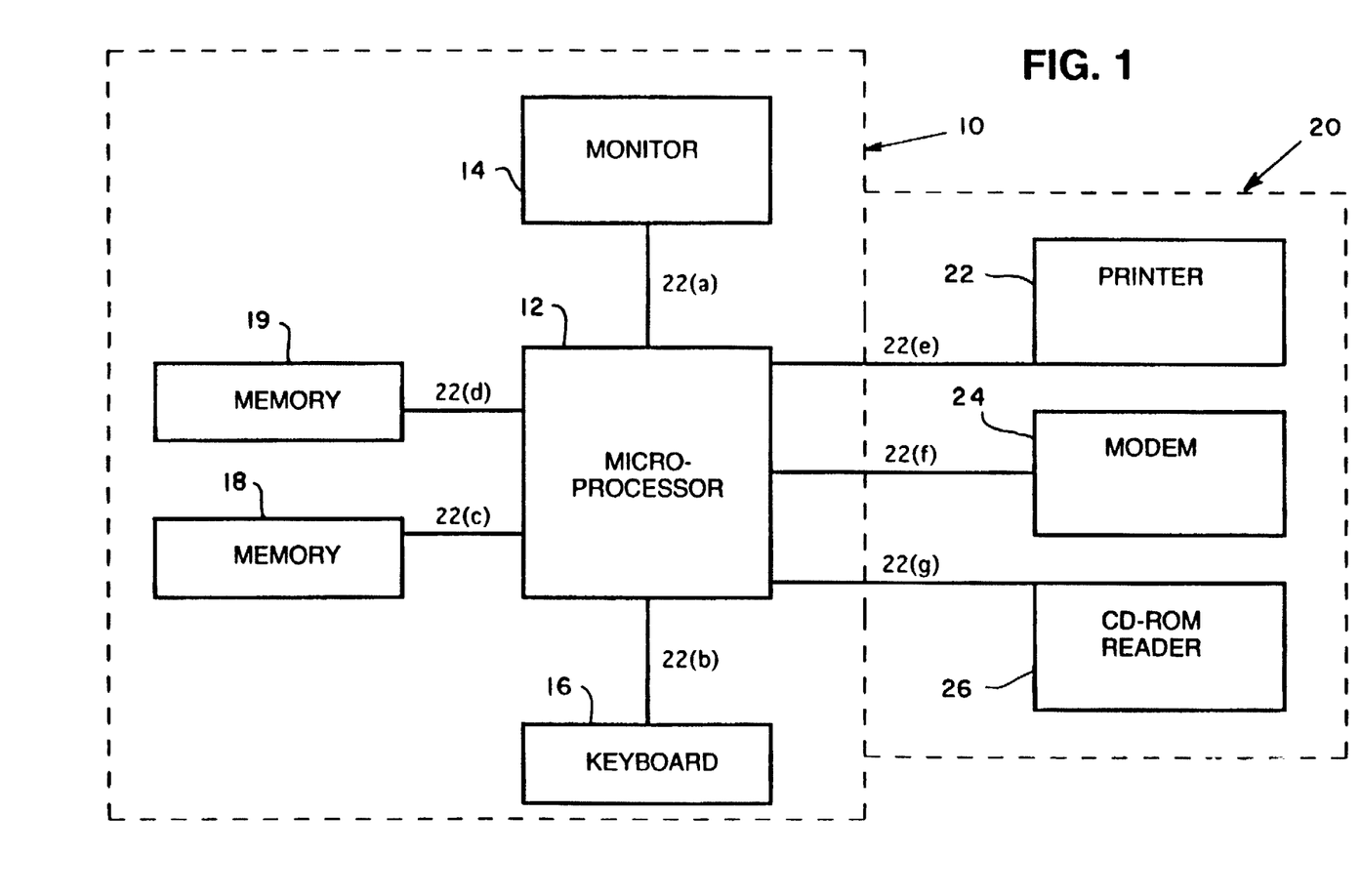
FIG. 1 is a block diagram of a postal coding or addressing system that can use the subject invention.

Turning to FIG. 1, there is shown a preferred embodiment of the system apparatus depicted in block form. The embodiment comprises two subsets that, combined, form an addressing or a postal coding system that can employ the subject invention. A system, as that term is used herein, comprises subsystems 10 and 25.

Addressing or postal coding subsystem 10 includes: microprocessor 12, for processing data stored or introduced to the system, is connected by interface cable 22(a) to monitor 14 for viewing the application screens and applicable displays; keyboard 16, for entering data to the system by the system operator, is connected to microprocessor 12 by interface cable 22(b); memory 18, for storing the application program or programs, is operatively connected to microprocessor 12 at 22(c); and, memory 19, for storing a repository, is operatively connected to microprocessor 12 at 22(d). Memories 18 and 19 can be co-located.

Addressing subsystem 25 represents the interface to the external environment for subsystem 10. In the preferred embodiment, subsystem 25 comprises printer 22, modem 24, and CD-ROM reader 26. Printer 22 is connected to addressing subsystem 10 by interface cable 22(e). Printer 22 can have any one of several tasks applied to it; for instance, Printer 22 can be used to print: reports; manifests; address lists; data; and/or graphics. Printer 22 could also serve as the printing means for printing to an addressable substrate. Modem 24 is connected to microprocessor 12 and addressing subsystem 10 by interface cable 22(f). Modem 24 serves the purpose of connecting the postal coding or addressing system to an external environment which might include external databases, additional application programs, or addressing data. In the alternative, modem 24 can be housed in the same structure as the microprocessor. CD-ROM reader 26 is connected to microprocessor 12 by interface cable 22(g). CD-ROM reader 26 is used for interfacing with application programs, databases, or additional application programs. In the alternative, CD-ROM reader 26 can be housed in the same structure as the microprocessor.

A microcomputer, such as subsystem 10, or any computer that can download data that can be printed on a printer, whether that printer is a peripheral device of the computer or not, uses application programs for creating data. The application programs are resident in the microcomputer ROM memory and in memory 18; memory 19 is utilized for the storing of address lists or repository data. The printers, such as printer 22, commonly utilized in the addressing art may also contain a microprocessor that is able to assign bar code data to addresses that are delivered from the host. These so-called "smart" printers vary in their ability to process data.

Figure 2:
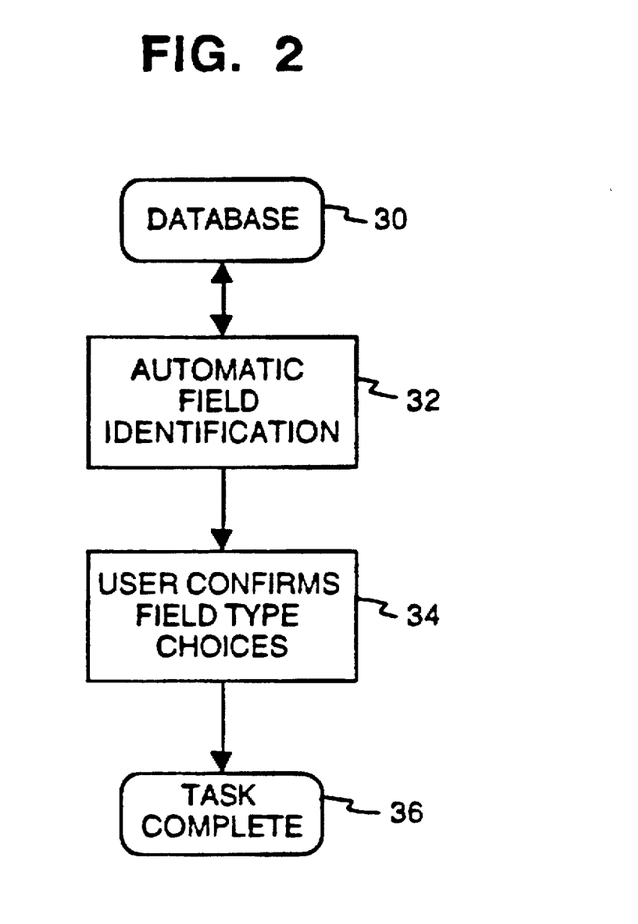
FIG. 2 is a high level flowchart of the inventive method.

Turning to FIG. 2, there is shown a high level flowchart of the inventive method. Any software application that needs to read or write to a database can employ the inventive method. The application program will attach a database at the direction of the system operator or application design, and indicate to the Field Identification Module (FIM) that the attachment has been made and that mapping of data fields can begin; the attachment and notification occur at step 30. The FIM may be resident within the application or can stand alone as an independent program to be invoked by a response to an application query.

From step 30, the method will advance to 32 where the FIM will follow three steps in mapping the attached database. The mapping of the fields, and the use of the repository, occurs during a process described in more detail in FIG. 5 herein. Once the mapping has been completed, the system operator confirms at step 34 that the field type choices are acceptable and the application program assigns the data field to the repository. The method then advances to step 36 and signals the system that the task is complete.

Figure 3:
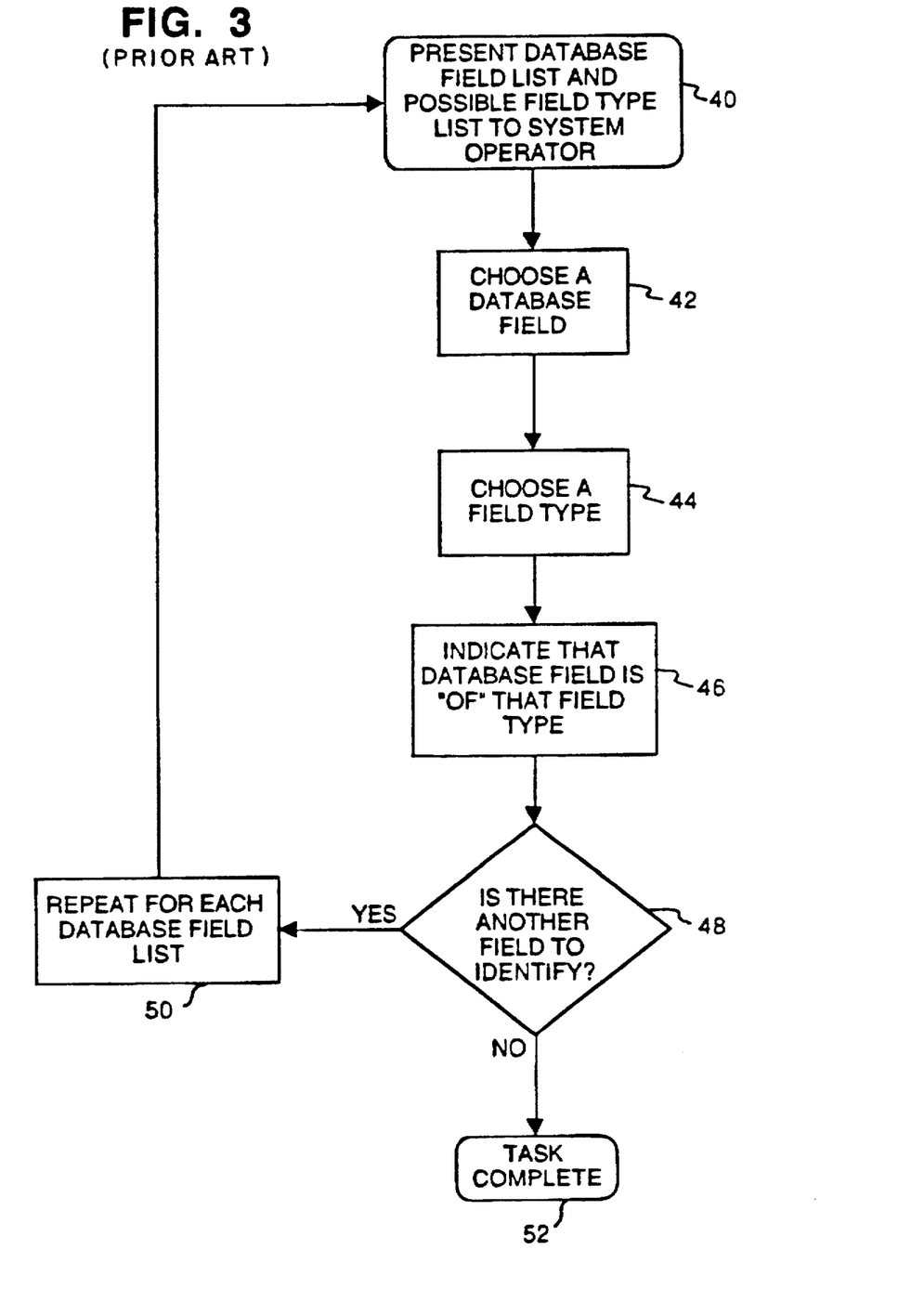
FIG. 3 is a high level flowchart of the method as it is currently practiced, or has been practiced, within the art.

Turning to FIG. 3, there is shown a high level flowchart of the method as it is currently practiced, or has been practiced, within the art.

The prior art system begins at step 40 where the system presents a database field list and a possible type list to the system operator, either by showing the lists on a display or by printing said lists. The method advances from step 40 to step 42 where the system operator selects a database field to be worked upon; the method then advances to step 44, where the system operator chooses a field type from the list where that field type best represents the database field selected at step 42. The method then advances to step 46.

At step 46, the system operator then informs the system that the database field "is of" the field type represented by the field type chosen from the list at step 44. The method then advances to step 48 where the system queries as to whether or not there is another field to identify. If the response to the query is "YES," then the system advances to step 50 where the system is signaled that the decision cycle is to be repeated and that the database field list and possible field type list should be prepared. The system then returns to step 40. If the response to the query at step 48 is "NO," however, then the system advances to step 52 where the task is acknowledged as complete.

Figure 4:
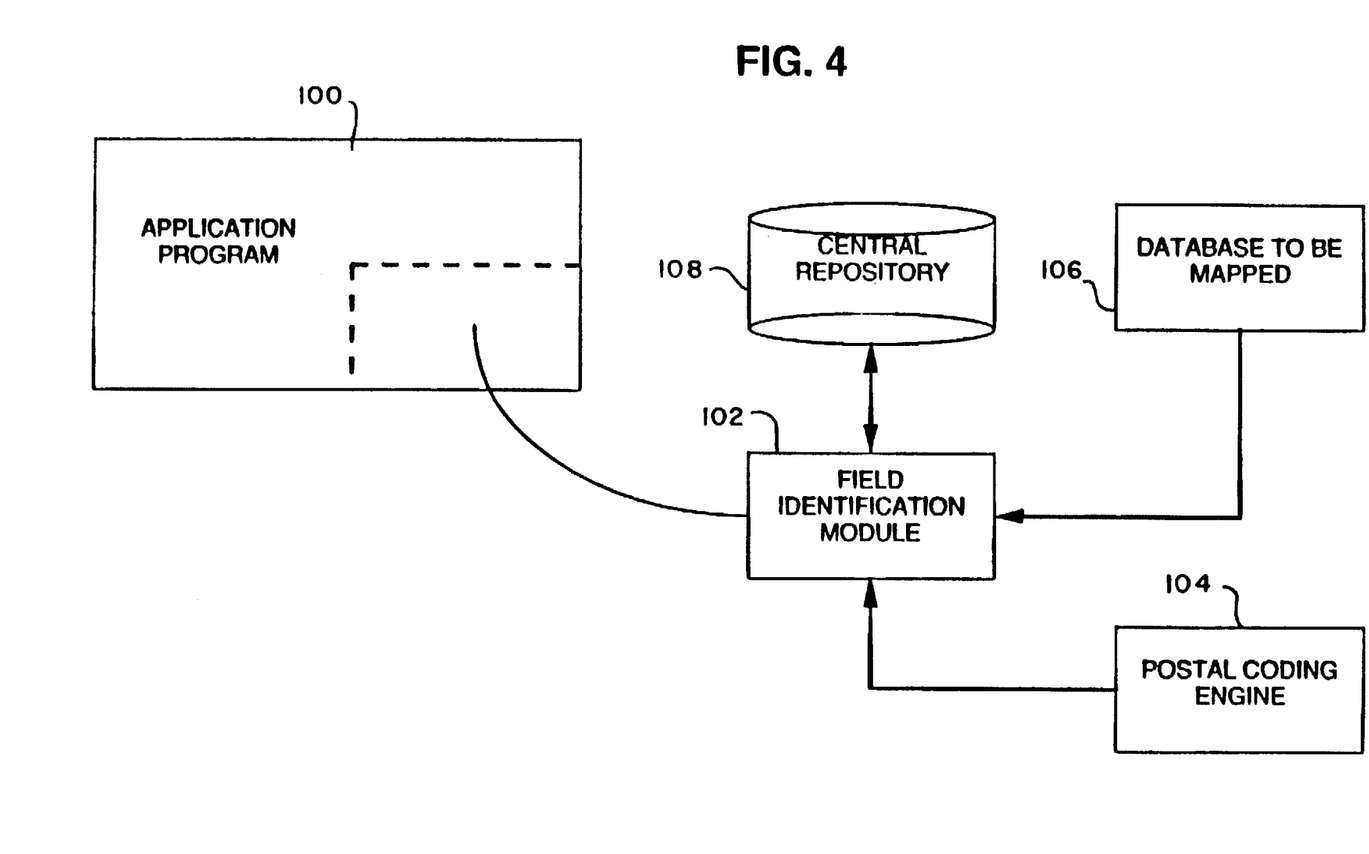
FIG. 4 is a block diagram representing the Field Identification Module (FIM) of the present invention. The FIM may be embedded within the application program or may stand alone.
Figure 5:
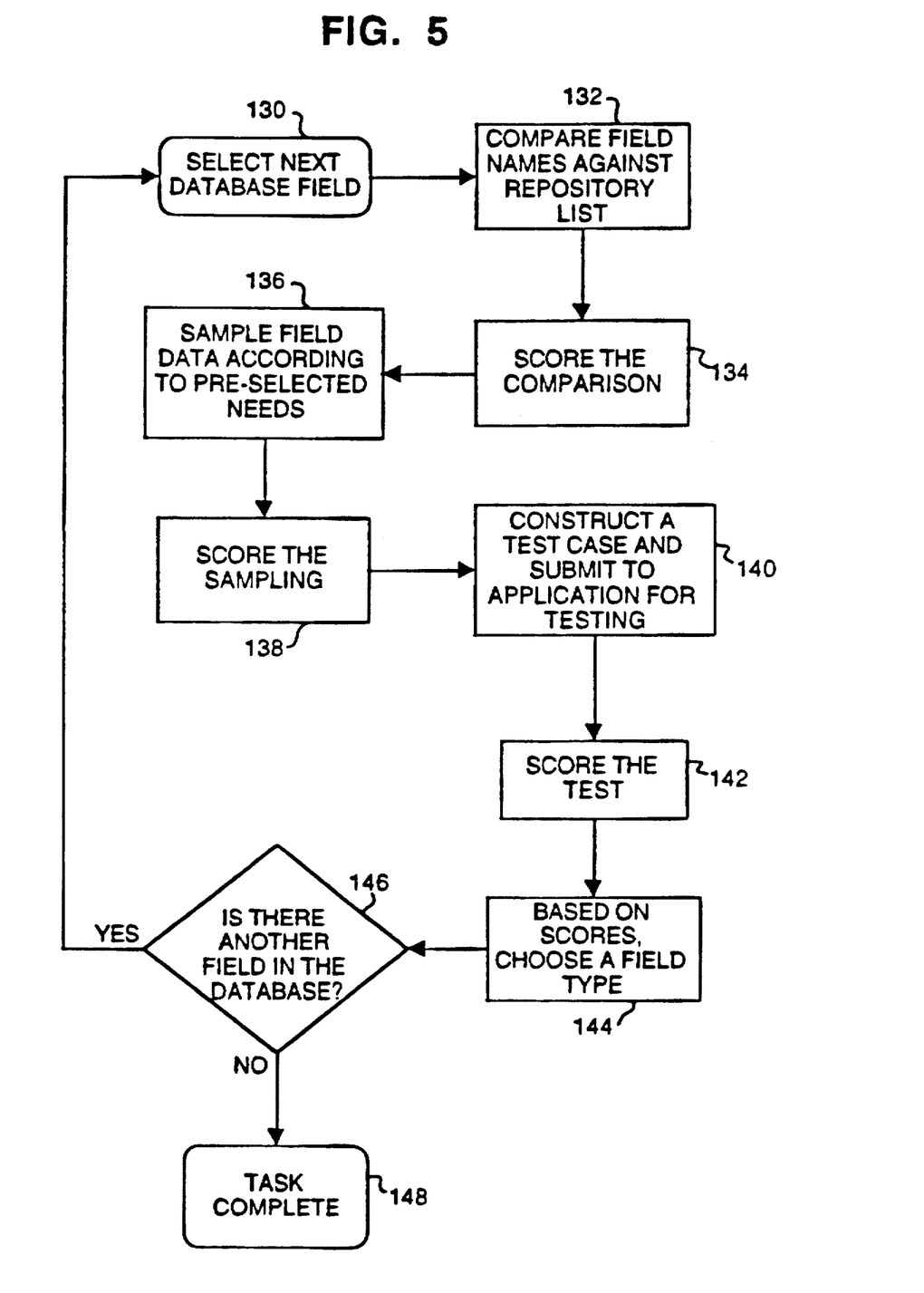
FIG. 5 is a flowchart of the mapping process performed by the Field Identification Module (FIM).

FIGS. 4 and 5 represent the preferred embodiment in detail. Turning to FIG. 4, there is shown a block diagram representing the Field Identification Module of the present invention. Application program 100 will tell Field Identification Module (FIM) 102 which database to attach for the mapping of data fields. FIM 102 may be resident within application program 100 or can stand alone as an independent program to be invoked by a response to an application query.

The FIM will follow three steps in mapping attached database 106; these steps are detailed in FIG. 5 hereinbelow. The steps follow sequentially. First, for each field to be mapped, the FIM will compare field names against previously identified field names in central Repository 108. Repository 108 is a database of known field names and the corresponding functions of the data within the field. Repository 100 will also be used to acquire knowledge by storing all new identifications of field type. The FIM will determine a match or matches based upon the results of the comparison between the selected data field and the Repository data.

At the second step, FIM 102 will perform a content analysis on a sampling of the field data 106. The third step is the construction of a test case that selects a subset of the field data and utilizes the data in postal coding engine 104 or host application to determine compatibility.

After completing the three steps, FIM 102 will assign field types to the fields in the database to be mapped. The application program will then query the system operator as to whether or not the field type assessed is the correct field type. Confirmed field type assignments are stored in central Repository 108 to be used in subsequent FIM operations.

Turning to FIG. 5, there is shown a flowchart of the steps followed by the FIM in mapping a data field.

Beginning at step 130, the FIM will select a next database field to be mapped. After selection of a data field, the method advances to step 132 where, for each field to be mapped, the FIM will compare field names against known field names in a central Repository. The Repository is a database containing a list of previously identified data field identifiers and their corresponding data field names. The Repository is also used to acquire knowledge by storing all new identifications of field type. The Repository may be co-located with the database or may located independently of the database.

From step 132 the method advances to step 134 where the FIM will determine a match or matches based upon the results of the comparison between the selected data field and the Repository data; the FIM will then assess a score to the match or matches made. The assessed score will be based upon a probability that a particular match is a correct match; the score will become a running score in that each subsequent step will cause the score to be re-assessed based upon a weighted average. The comparison is made by looking up the database field name in the repository. If the database field name and the repository field name are the same, then there is a match; a match is assessed a score of 1.0, while a non-match is given a 0.0 score.

From step 134, the method advances to step 136 where the FIM will perform a content analysis on a sampling of the field data. The analysis is accomplished by comparing the sample data to a pre-selected set of criteria that the application program would normally expect to be present. The method then advances from step 136 to step 138 where, based upon the results of the sample analysis, the FIM will then assess a score to the sample made and then re-calculate the weighted running score. Each of the criteria of the pre-selected list are equal to one part, each part of equal weight, and each combined totaling no more than 0.7. The score assessed by the FIM at this step is representative of a probability that the second comparison is an accurate comparison. In the preferred embodiment of the present invention, the score will not exceed 0.7, though this threshold could be shifted for alternative embodiments according to the requirements of the embodiment.

From step 138, the method advances step 140 where the FIM constructs a test case from the field data and submits the test case to the postal coding engine or host application to determine working compatibility. The test case is constructed from the sample previously selected for testing. For instance, if at step 136, it was determined that the field type is "city" data; then, the city would be given a previously identified street address if one exists, or a "dummy" address would be assigned (i.e., 1 Main Street) followed by a state.

The state would be a previously identified state if one exists, or the FIM would assign a state based upon previous sampling. The test case would then be submitted to the postal coding engine or host application for a match with an address stored in the postal coding application or host application. A probability that the city field type is accurate will then be assessed. If the system, for example, returned an error in reading the street address, but all other parts of the address were correct, then there would be a higher probability that the city was in fact a city then if the full address were found not to have a match. In an alternative embodiment of the present invention, the individual score assessed at this step can be altered depending upon the confidence in the database being tested against.

From step 140, the method then advances to step 142 where the FIM will then assess a score to the test case made and then re-calculate the running score. In the preferred embodiment of the present invention, the score will not exceed 0.7, though this threshold could be shifted for alternative embodiments according to the requirements of the embodiment.

After assessing a score at step 142, the method advances to step 144 where the FIM will determine whether or not the running score meets a preselected threshold. If the running score meets the pre-selected threshold, then the FIM will assign a field type to the mapped field data. Confirmed field type assignments are stored in the central Repository to be used in subsequent FIM operations. Regardless of the threshold outcome, the method will advance to step 146 where the application program will then query the system as to whether or not there is another field in the database to be mapped. If the response to the query at step 146 is "YES," then the method returns to step 130 where the system will select the next database field. If, however, the response to the query at step 146 is "NO," then the method advances to step 148 where the system acknowledges that the task is complete.

A Working Example of the Method

TABLE 1

| Database To Be Mapped | |
|---|---|
| Field Names | Field Content |
| Salutation | |
| First Name | Ray |
| | David P. |
| | Phyllis |
| | George |
| Last Name | Terlaga |
| | Gardner |
| | Guerra |
| | Calvert |
| Title | President |
| | President |
| | Vice President |
| | Senior Engineer |
| Company | Madison Street Play |
| | My Home Business |
| | Her Home Business |
| | Hype/Help Systems |
| Address1 | 1 N. Madison St. |
| | 6 Santa La. |
| | 425 Post Road |
| | 615 Saratoga Rd. |
| Address2 | |
| City | Arlington |
| | New Milford |
| | Fairfield |

TABLE 1-continued

Database To Be Mapped

| Field Names | Field Content |
|---|---|
|  | Lawrence |
| Ship State | VA |
|  | CT |
|  | CT |
|  | KS |
| Zip | 22203 |
|  | 06776 |
| Zip4 | 1105 |
| dpbc | 012 |
| Error |  |
| Phone1 |  |
| Phone2 |  |
| Fax |  |
| Notes |  |

TABLE 2

Repository

| Field | Type |
|---|---|
| suite | 5002 |
| addr1 | 5002 |
| companyaddress | 5003 |
| ship address | 5003 |
| address1 | 5003 |
| address | 5003 |
| street | 5003 |
| loc city | 5004 |
| ship city | 5004 |
| cityname | 5004 |
| city | 5004 |
| loc state | 5006 |
| ship region | 5006 |
| st | 5006 |
| state abbr | 5006 |
| region | 5006 |
| state | 5006 |
| pcode | 5007 |
| ship postal code | 5007 |
| zip code | 5007 |
| postalcode | 5007 |
| postal code | 5007 |
| zip | 5007 |
| Fullzip | 5008 |
| PostalCode | 5008 |
| crrt | 5009 |
| carrier | 5009 |
| dpbc | 5010 |
| dpbc addon | 5010 |
| addon code | 5011 |
| zip4 | 5011 |
| zip+4 | 5011 |
| errorcode | 5012 |
| error | 5012 |
| error code | 5012 |
| cmpny | 5014 |
| company name | 5014 |
| company | 5014 |
| campanyname | 5014 |
| dept name | 5015 |
| contact title | 5016 |
| contacttitle | 5016 |
| title | 5016 |
| salutation | 5017 |
| cntct | 5018 |
| contact name | 5018 |
| contactname | 5018 |
| contact | 5018 |
| name | 5018 |
| first name | 5019 |
| firstname | 5019 |

TABLE 2-continued

Repository

| Field | Type |
|---|---|
| fname | 5019 |
| last name | 5020 |
| lastname | 5020 |
| lname | 5020 |

Table 1 is the database that is being mapped. Table 2 is the repository. Reading across the database field names shown in Table 1 you can see that we have a field called "Ship State." Let's assume that this is the field to be mapped.

Step 1: Scan the repository "field" column for "Ship State." There is no match, so a score of 0.0 is assigned to each possible field type.

Current scores are:
Address=0.0
City=0.0
State=0.0
ZIP=0.0
ZIP4=0.0
FullZIP=0.0

Step 2: Do the content analysis.

Create sample. Since the database is small, the sample size is 1. The sample data to be analyzed is the contents of the first "Ship State" data item which is "VA."

Text to see if contents is an address.

1. Does the sample contain a "space" character? No, don't increment the "Address" score by 0.1. "Address" type score is 0.0.
2. Does the sample contain numbers and alphabetic characters? No, don't increment the "Address" score by 0.3. "Address" type score is 0.0.
3. Is the length of the sample greater than 20 characters? No, don't increment the "Address" score by 0.3. "Address" type score is 0.0.
4. "Address" type score is 0.0.

Test to see if contents is a city.

1. Does the sample contain only alphabetic characters? Yes, increment "City" score by 0... "City" score is now 0.2.
2. Is the length of the sample less than 20 characters? Yes, increment "City" score by 0.2. "City" score is now 0.4.
3. Is the length of the sample greater than 2 characters? No, don't increment the "City" score by 0.3. "City" score is still 0.4.
4. "City" type score is 0.4.

Test to see if contents is a state.

1. Does the sample contain only alphabetic characters? Yes, increment "State" score by 0.3. "State" score is now 0.3.
2. Is the length of the sample equal to 2 characters? Yes, increment the "State" score by 0.4. "State" score is now 0.7.
3. "State" type score is 0.7.

Test to see if contents is a 5-digit ZIP.

1. Does the sample contain only numeric characters? No, don't increment "ZIP" score by 0.3. "ZIP" score is 0.0.

2. Is the length of the sample equal to 5 characters? No, don't increment "ZIP" score by 0.4. "ZIP" score is 0.0.
3. "ZIP" type score is 0.0.

Test to see if contents is a 4-digit ZIP.
1. Does the sample contain only numeric characters? No, don't increment "ZIP4" score by 0.3. "ZIP4" score is 0.0.
2. Is the length of the sample equal to 4 characters? No, don't increment the "ZIP4" score by 0.4. "ZIP4" score is 0.0.
3. "ZIP4" type score is 0.0.

Test to see if contents is a 9-digit ZIP.
1. Does the sample contain only numeric characters? No, don't increment "FullZIP" score by 0.3. "FullZIP" score is 0.0.
2. Does the sample contain only numeric characters and one hyphen ("-") character? No, don't increment the "FullZIP" by 0.3. "FullZIP" score is 0.0.
3. Is the length of the sample equal to 9 characters? No, don't increment the "FullZIP" score by 0.4. "FullZIP" score is 0.0.
4. Is the length of the sample equal to 10 characters? No, don't increment the "FullZIP" score by 0.4. "FullZIP" score is 0.0.
5. "FullZIP" type score is 0.0.

Content analysis is complete. Current scores are:

Address=0.0
City=0.4
State=0.7
ZIP=0.0
ZIP4=0.0
FullZIP =0.0.

Step 3: Construct a test case for each field type that has a score greater than 0.0 and submit them to postal coding engine.

Four pieces of data can must be submitted to postal coding engine: an address, a city, a state, and a ZIP code. The field type to be tested determines the pieces of data that will be filed in for the test.

Construct test case for "City."

If a street address field has already been mapped, pull the data for that field and assign to test case address; or, construct a dummy street address of "1 Main Street." Since there is an address field in the database that, based on our repository, would have met the threshold value, pull that data for the test case street address. Use the sample "VA" as the city. Submit a test for each state. The test case would appear as follows:

for each state abbreviation
  Set test case to:
    street address="1 N Madison St"
    city="VA"
    state=next state abbreviation (e.g. AK, AL, etc.)

Submit to postal coding engine

If engine indicates that the address is valid, increment "City" score by 0.7. Since there is no city called "VA" in any of the 50 states, the "City" score will remain 0.4.

Construct test case for state.

A test case can be constructed for a state only if a city field has already been mapped. With some degree of confidence, the "dummy" street address of "1 Main Street," can be used but a "dummy" city name cannot be constructed with any degree of confidence. In this case, both a street address field and a city field, exist in Table 1, so we can therefore construct a test case.

street address="1 N Madison St"
city="Arlington"
state="VA"

Submit to postal coding engine

If engine tells us that address is valid, increment "State" score by 0.7.

Since this is a valid address, the "State" score is incremented and set to 1.0. The score is not allowed to go longer than 1.0.

Test case analysis is complete. Current scores are:

Address=0.0
City=0.4
State=1.0
ZIP=0.0
ZIP4 =0.0
FullZIP=0.0

This field is assigned a type of "State" because only the state field type passes the threshold.

As can be appreciated by those skilled in the art, a number of variations of the subject invention are possible. More specifically, the type of system that can employ the subject invention need not be restricted to a postal coding or addressing system. Any system that needs to identify an unknown database could benefit from the invention herein. Further variations include, but are not limited to: the contents of the database with respect to type and function; the number of databases that could be accessed by the FIM; the type of data processor and its respective peripheral devices that can be employed as the supporting system; and, the weighting of the comparison criteria when determining the running score of the method to be assessed by the FIM.

What is claimed is:

1. A method of determining the contents of a selected data field comprising the steps of:
  (a) attaching, from an application program in a data processing system, a database to be mapped;
  (b) activating, from said application program, a field identification module resident within said application program, wherein said field identification module will scan said contents of said data field to locate a data field identifier for each of said data fields to be worked upon;
  (c) comparing each of said data field identifiers with a list of known identifiers stored in a repository;
  (d) assessing a first score in respect of said comparison wherein said score is representative of a probability that said comparison is an accurate comparison;
  (e) sampling said data field according to a pre-selected list of requirements and making a second comparison wherein said data field is compared with said pre-selected list of requirements and wherein each one of said pre-selected list of requirements is weighted, and wherein the sum of said each one of said pre-selected list of requirements does not exceed a pre-determined threshold;
  (f) assessing a second score in respect of said sampling wherein said second score is representative of a probability that said second comparison is an accurate comparison;

(g) constructing a test case wherein said data field is used in said application program and a third comparison between an actual result and an expected result is made in respect of said test case;

(h) assessing a third score in respect of said test case wherein said third score is representative of a probability that said third comparison is an accurate comparison;

(i) choosing a field type based on the cumulative result of said first score, said second score, and said third score.

2. The method of claim 1, wherein said field identification module is a standalone module not resident within said activation program.

3. The method of claim 1, wherein said determining steps comprise a mapping cycle.

4. The method of claim 3, wherein said first score, said second score, and said third score as they are individually assessed, are factored to produce a running score, wherein said running score is reflective of the most recent score assessed weighted averaged together with previous scores, if any, assessed during said mapping cycle.

5. The method of claim 1, wherein construction of said test case comprises the steps of:

(a) selecting said sample from said data field;

(b) building a test case subset from previously identified data wherein said test case subset comprises said sample;

(c) submitting said test case subset to an application program wherein said test case subset is compared to data contained in said application program; and (d) determining the accuracy of said comparison.

6. The method of claim 1, wherein said repository is co-located with said database.

7. The method of claim 1, wherein said repository is located independently of said database.

8. The method of claim 1, wherein said data field identifier and said data field represented thereby are added to said repository as a one of said known identifiers.

9. A method of automatically identifying a database field, in a postal coding system, comprising the steps of:

(a) attaching, from a postal coding program in a data processing system, a database to be mapped;

(b) activating, from said application program, a field identification module resident within said application program, wherein said field identification module will scan said contents of said data field to locate a data field identifier for each of said data fields to be worked upon;

(c) comparing each of said data field identifiers with a list of known identifiers stored in a repository;

(d) assessing a first score in respect of said comparison wherein said score is representative of a probability that said comparison is an accurate comparison;

(e) sampling said data field according to a pre-selected list of address coding requirements and making a second comparison wherein said data field is compared with said pre-selected list of address coding requirements and wherein each one of said pre-selected list of address coding requirements is weighted, and wherein the sum of said each one of said pre-selected list of address coding requirements does not exceed a predetermined threshold:

(f) assessing a second score in respect of said sampling wherein said second score is representative of a probability that said second comparison is an accurate comparison;

(g) constructing a test case wherein said data field is used in said application program and a third comparison between an actual result and an expected result is made in respect of said test case;

(h) assessing a third score in respect of said test case wherein said third score is representative of a probability that said third comparison is an accurate comparison; and (i) choosing a field type based on the cumulative result of said first score, said second score, and said third score.

10. The method of claim 9, wherein said field identification module is a standalone module not resident within said activation program.

11. The method of claim 9, wherein said determining steps comprise a mapping cycle.

12. The method of claim 11, wherein said first score, said second score, and said third score as they are individually assessed, are factored to produce a running score, wherein said running score is reflective of the most recent score assessed weighted averaged together with previous scores, if any, assessed during said mapping cycle.

13. The method of claim 9, wherein construction of said test case comprises the steps of:

(a) selecting said sample from said data field;

(b) building an address from previously identified address data wherein said address comprises said sample;

(c) submitting said built address to a postal coding program wherein said built address is compared to address data contained in said postal coding program; and (d) determining the accuracy of said comparison.

14. The method of claim 9, wherein said repository is co-located with said database.

15. The method of claim 9, wherein said repository is located independently of said database.

16. The method of claim 9, wherein said data field identifier and said data field represented thereby are added to said repository as a one of said known identifiers.

* * * * *